United States Patent
Gilmore et al.

(10) Patent No.: US 9,939,808 B2
(45) Date of Patent: Apr. 10, 2018

(54) MONITOR DATA ATTACHMENT TO PRODUCT LOTS FOR BATCH PROCESSES

(71) Applicant: Texas Instruments Incorporated, Dallas, TX (US)

(72) Inventors: Damien Thomas Gilmore, Allen, TX (US); Nicholas Andrew Kusek, Dallas, TX (US); Kenneth Ryan Thomas, Richardson, TX (US); Michael Glenn Williams, Grapevine, TX (US); Robert Ray Spangler, Lucase, TX (US); Ingu Song, Richardson, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 516 days.

(21) Appl. No.: 14/570,623

(22) Filed: Dec. 15, 2014

(65) Prior Publication Data

US 2015/0253764 A1  Sep. 10, 2015

Related U.S. Application Data

(60) Provisional application No. 61/948,874, filed on Mar. 6, 2014.

(51) Int. Cl.
G05B 19/418 (2006.01)

(52) U.S. Cl.
CPC ............. *G05B 19/41875* (2013.01); *G05B 2219/2602* (2013.01); *Y02P 90/22* (2015.11)

(58) Field of Classification Search
CPC ...... G05B 19/41875; G05B 2219/2602; Y02P 90/02; Y02P 90/22
See application file for complete search history.

(56) References Cited

U.S. PATENT DOCUMENTS

| | | | |
|---|---|---|---|
| 6,593,154 B2 * | 7/2003 | Marume | H01L 22/20 118/678 |
| 6,788,988 B1 * | 9/2004 | Pasadyn | G05B 15/02 257/E21.525 |
| 6,865,434 B1 | 3/2005 | Lin et al. | |
| 2005/0032250 A1 * | 2/2005 | Mui | H01L 22/20 438/14 |

* cited by examiner

*Primary Examiner* — Miranda Huang
*Assistant Examiner* — John Park
(74) *Attorney, Agent, or Firm* — Andrew R. Ralston; Charles A. Brill; Frank D. Cimino

(57) ABSTRACT

A method of process control for a batch process includes pre-measuring a monitor lot to obtain pre-metrology data regarding at least a first process parameter. There are no product units included with the monitor lot. The pre-metrology data is saved together with an identifier for the first monitor unit. A batch is staged for the batch process including at least a first product lot including a plurality of product units together with the first monitor unit. The batch is batch processed through the batch process. After the batch processing, the first monitor unit is measured to obtain post-metrology data for the first process parameter. At least one of the post-metrology data and a difference between the post-metrology data and pre-metrology data is saved to a data file with an identifier for the first product lot or the pre-metrology data and post-metrology data is directly written to the first product lot.

18 Claims, 5 Drawing Sheets

MONITOR DATA ATTACHMENT TO PRODUCT LOTS FOR BATCH PROCESSES

CROSS REFERENCE TO RELATED APPLICATIONS

This application claims the benefit of Provisional Application Ser. No. 61/948,874 entitled "A Method of Data Collection and Transfer for Semiconductor Batch Processing", filed Mar. 6, 2014, which is herein incorporated by reference in its entirety.

FIELD

Disclosed embodiments relate to data collection for process control of batch processes.

BACKGROUND

Semiconductor fabrication includes a plurality of process steps (e.g., furnace operations such as thermal oxidation or low pressure chemical vapor deposition (LPCVD) that involve processing a plurality of different production lots of product wafers together in one "batch" process. A production wafer lot may include 25 wafers, and a batch may include 6 lots so that each batch for batch processing includes 150 wafers, along with a monitor lot including one or more monitor wafer(s) that are generally unpatterned wafers having minimal (if any) earlier processing to represent the product wafers to allow measurement of the layer formed in the batch process which is not easily obtainable (and sometimes not possible) from the product wafers due to layers and/or topography formed on the substrate from earlier processing.

Each production lot in a batch is staged with the monitor lot to move through the same steps including pre-measurements step(s) (e.g., pre-particle data and pre-thickness data) in order for the lots to receive the needed process control data at the batch process step, such as the thickness of a deposited layer (e.g., silicon nitride). Monitor units constituting a monitor lot are thus needed for each lot to accommodate for the different process conditions for each production flow. All lots must generally move together which delays staging and process time while the initial (pre) process control measurements are made.

SUMMARY

This Summary is provided to introduce a brief selection of disclosed concepts in a simplified form that are further described below in the Detailed Description including the drawings provided. This Summary is not intended to limit the claimed subject matter's scope.

Disclosed embodiments describe methods of data collection for process control of batch processes where a single "universal" monitor lot comprising at least one monitor unit is able to accommodate all process conditions for a plurality of different production flows that utilize a given process step (e.g., a furnace step, such as to grow a thermal silicon oxide layer or to deposit a silicon nitride layer). An "inherit" functionality is the enabling feature which allows monitor lot to inherit the process conditions from the production lots.

The universal monitor unit(s) carries stored pre-metrology data (e.g., in the case of semiconductor processing incoming film thickness and pre-particle data) and this stored pre-metrology data is transferred to the specific production lots that the monitor unit(s)) is batched with in a staging step for the batch process, instead of conventionally being staged with the monitor lot back at the pre-measurement step required in conventional monitor-based process control. As a result, that the process flow for the individual production lots do not need to include the pre-metrology steps, and the pre-metrology data is inherited when it is transferred to the production lot(s) after the batch process is completed (e.g., at a furnace step, instead of the pre-measurement step).

Disclosed methods include pre-measuring a monitor lot including at least a first monitor unit to obtain pre-metrology data regarding at least a first process parameter. Unlike conventional process control, there are no product units included in the pre-measuring step with the monitor lot. The pre-metrology data is saved together with an identifier for the first monitor unit. A batch is staged for the batch process including at least a first product lot including a plurality of product units together with the first monitor unit. The batch is batch processed through the batch process. After the batch processing, the first monitor unit is measured to obtain post-metrology data for the first process parameter. At least one of the post-metrology data and a difference between the post-metrology data and pre-metrology data is saved to a data file with an identifier for the first product lot. As used herein, a "data file" means any permanent data storage device or system for storing data.

BRIEF DESCRIPTION OF THE DRAWINGS

Reference will now be made to the accompanying drawings, which are not necessarily drawn to scale, wherein.

DETAILED DESCRIPTION

Figure 1A:
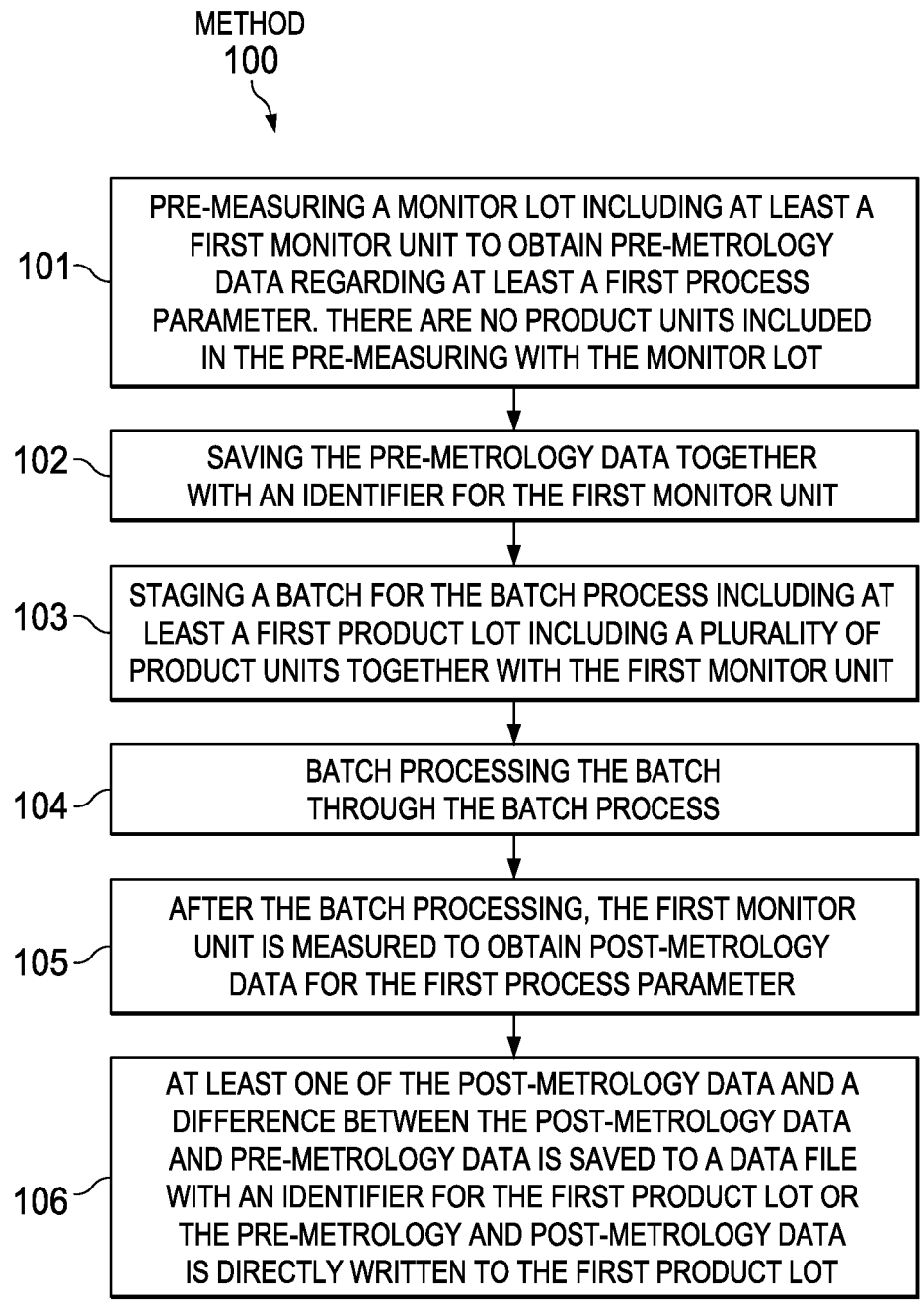
FIG. 1A is a flow chart for an example method of process control for a batch process including disclosed inherit functionality, according to an example embodiment.

Example embodiments are described with reference to the drawings, wherein like reference numerals are used to designate similar or equivalent elements. Illustrated ordering of acts or events should not be considered as limiting, as some acts or events may occur in different order and/or concurrently with other acts or events. Furthermore, some illustrated acts or events may not be required to implement a methodology in accordance with this disclosure.

FIG. 1A is a flow chart for an example method of process control for batch processes including inherit functionality, according to an example embodiment. Although generally described for process steps in a semiconductor processes, disclosed embodiments can be used for any process that uses a monitor or sample (non-product) to represent the product for monitoring the quality of a batch of production (product) material, such as disc media (CD's, DVD's, HD-DVD's, Blu-ray, etc.).

Step 101 comprises pre-measuring a monitor lot including at least a first monitor unit to obtain pre-metrology data regarding at least a first process parameter. The monitor lot can be any number of units, typically being 1, 3 or 5 units when the units are wafers for a semiconductor process, where the semiconductor process parameters may be pre-particle data (counts) and pre-thickness data (thickness values). Again for a semiconductor process, the process may be a diffusion, etch (e.g., reactive ion etching (RIE), oxide growth, or a deposition such as a low pressure chemical vapor deposition (LPCVD) process, and the monitor lot may comprise a bare silicon substrate(s) with various pre-preparation (e.g. HF dip/or SC1 ($H_2O_2$ and $NH_4OH$) clean, or a silicon substrate(s) having various dielectric layer(s) such as such as 1,000 A silicon oxide (or some combination of films) thereon.

Disclosed monitor lots consolidate all prior monitor types used in conventional process control for a given batch process step that use the same substrate (e.g., for a semiconductor process, a silicon substrate(s) having about 1,000 A of silicon oxide thereon) into one monitor type, and thus may be regarded as being universal monitors. As noted above, unlike conventional process control, there are no product units included in the pre-measuring with the monitor lot.

Step 102 comprises saving the pre-metrology data together with an identifier for the first monitor unit in a database file in a suitable memory, typically a non-volatile memory. As there is no product lot associated with the pre-metrology data, the pre-metrology data saved in step 102 makes no reference to any product lot. Historically, as described above, for semiconductor processes, each product lot requires its own monitor wafer(s) to be staged with to thus be physically with the product lot in the same wafer cassette or Standard Mechanical InterFace (SMIF) pod for this data to be "attached" to the product lot at this pre-metrology step.

Step 103 comprises staging a batch (e.g., a batch is "recommended" by an automation system such as real-time dispatch (RTD)) for a process step comprising at least a first product lot including a plurality of product unit(s) together with the first monitor unit. The batch can be a single lot, or include multiple lots, such as 6 lots. In the case of semiconductor processes, there may be six 25 wafer lots in a batch together with a monitor lot.

Step 104 comprises batch processing the batch through the process step. Step 105 comprises after the batch processing, post-measuring the first monitor unit to obtain post-metrology data for the first process parameter (e.g., a layer thickness and post particle data). Step 106 comprises saving at least one of the post-metrology data and a difference between the post-metrology data and pre-metrology data to a data file with an identifier for the first product lot or the pre-metrology data and post-metrology data is directly written to the first product lot.

Figure 1B:
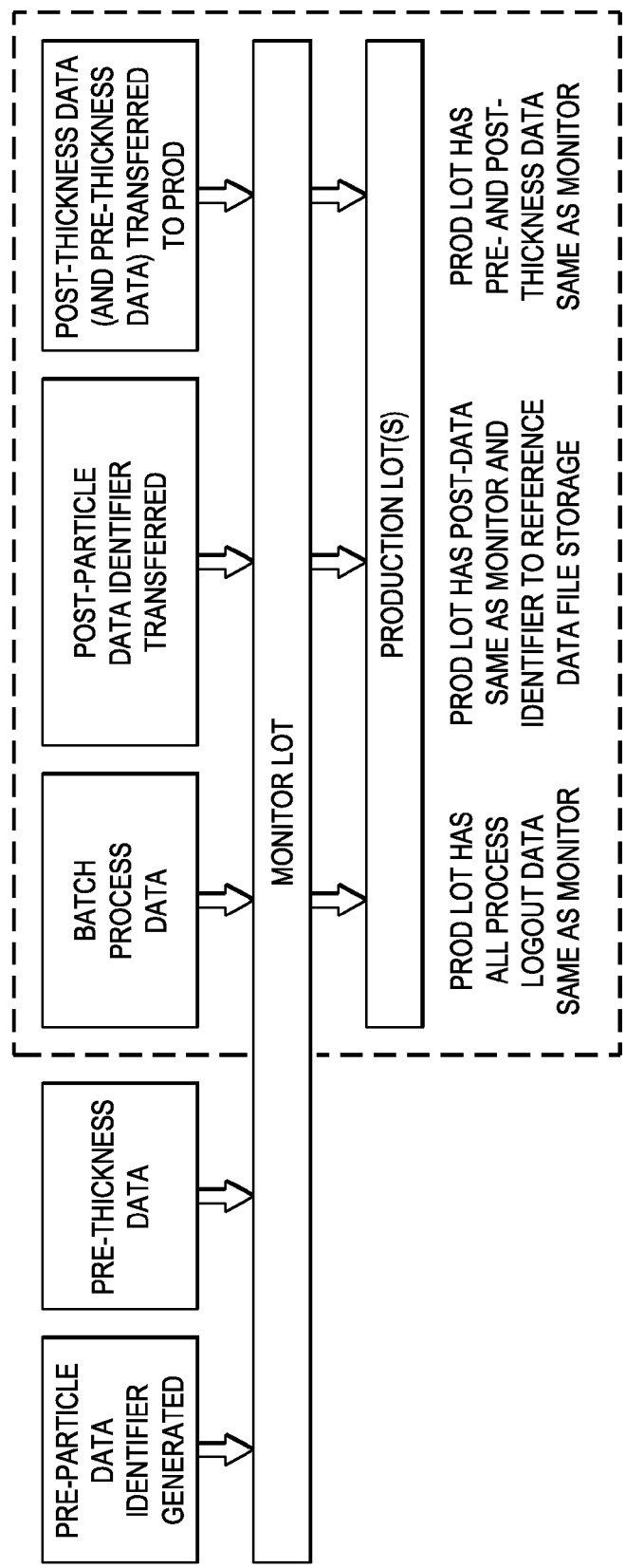
FIG. 1B depicts the data flow where the pre and post monitor metrology data is directly written to the product lot(s) so that the monitor data is directly available by just pulling up the lot number(s), according to an example embodiment.

When using monitor data saved to a data file with an identifier the data is accessed using an identifier that is attached to the lot so that an additional step is needed to "see" the data. In practice, the pre and post-monitor metrology data is generally directly written to the product lot(s) so that this monitor data is directly available by just pulling up the lot number(s). FIG. 1B depicts the data flow where the pre and post-monitor metrology monitor data is directly written to the product lot(s) so the monitor data is directly available by just pulling up the lot number(s).

The product units in the first product lot thus acquire their metrology data from the monitor lot without being staged with and thus included with the monitor lot for the pre-measuring (step 101) or upon the saving of the pre-metrology data from the monitor lot (step 102). The method can include a disassemble step where the monitor wafer(s) are placed in a queue for rework or reclaim.

Method 100 thus provides automated functionality to apply the correct process variables to a universal monitor, whereby the monitor flow incorporates the collection and transfer of the pre-metrology data to the lot(s) in the batch process. Method 100 also allows each individual process (e.g., polysilicon deposition) to standardize to its own specific universal monitor (e.g., 1,000 A of silicon oxide on an unpatterned silicon substrate). Production lots are now staged at the batch process operation (instead of the pre-measurement step), and the preliminary monitor measurement data is transferred to the production lots after the batch is processed.

Disclosed embodiment solve the problem in conventional monitor unit-based process control where all production lots in a batch must move through the same steps (including pre-measuring step 101) as the monitor lot in order to receive their needed process control data, and multiple monitor devices being needed to accommodate the different process conditions of each production flow. In conventional monitor unit-based process control all lots must move together beginning with staging together at the pre-measurement step which is recognized to delays staging and process time so that the pre-measurements can be made.

Figure 2:
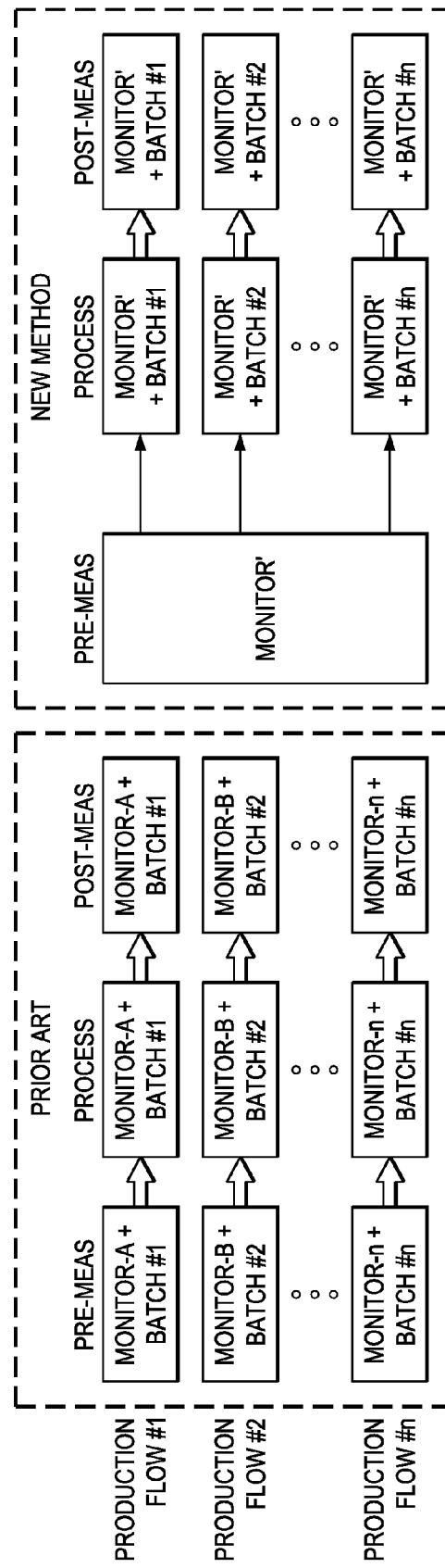
FIG. 2 compares steps in a conventional method of process control for a batch process to steps for a disclosed method of process control for a batch process including disclosed inherit functionality shown according to an example embodiment.

FIG. 2 compares steps in a conventional method of process control for a batch process labeled "Prior Art" to steps for a disclosed method of process control for a batch process shown as a "New Method" including disclosed inherit functionality according to an example embodiment. For the conventional method there are multiple monitor lots (shown as Monitor-A, Monitor-B . . . Monitor-n) required for each production flow 1, 2 . . . n). Each production flow includes its own batch (Batch #1, Batch #2, . . . Batch #n) which comprises one or more production lots. The respective monitor lot must be staged together with the batch (production lot(s)) before the pre-measurement step (shown as "Pre-Meas") to enable the respective monitors to be pre-measured while together with the respective Batches, which is before the batch process step (shown as "Process") takes place. After the batch process is completed a post measuring step (shown as "Post-Meas") takes place where the respective monitor lots are measured.

For the disclosed method of process control, the monitor lot alone is measured at the pre-measuring step. Only one monitor lot (shown as 'monitor') is needed for all production flows (1, 2 . . . n) for the batch process step. The 'monitor' is thus staged independently of the production lots in the batch, and the staging of 'monitor' and the respective production lots occurs at the batch process step. After the batch process, following the "Post-Meas" step the product lots in the respective batches inherit the monitor's pre-measurement(s) data.

Figure 3:
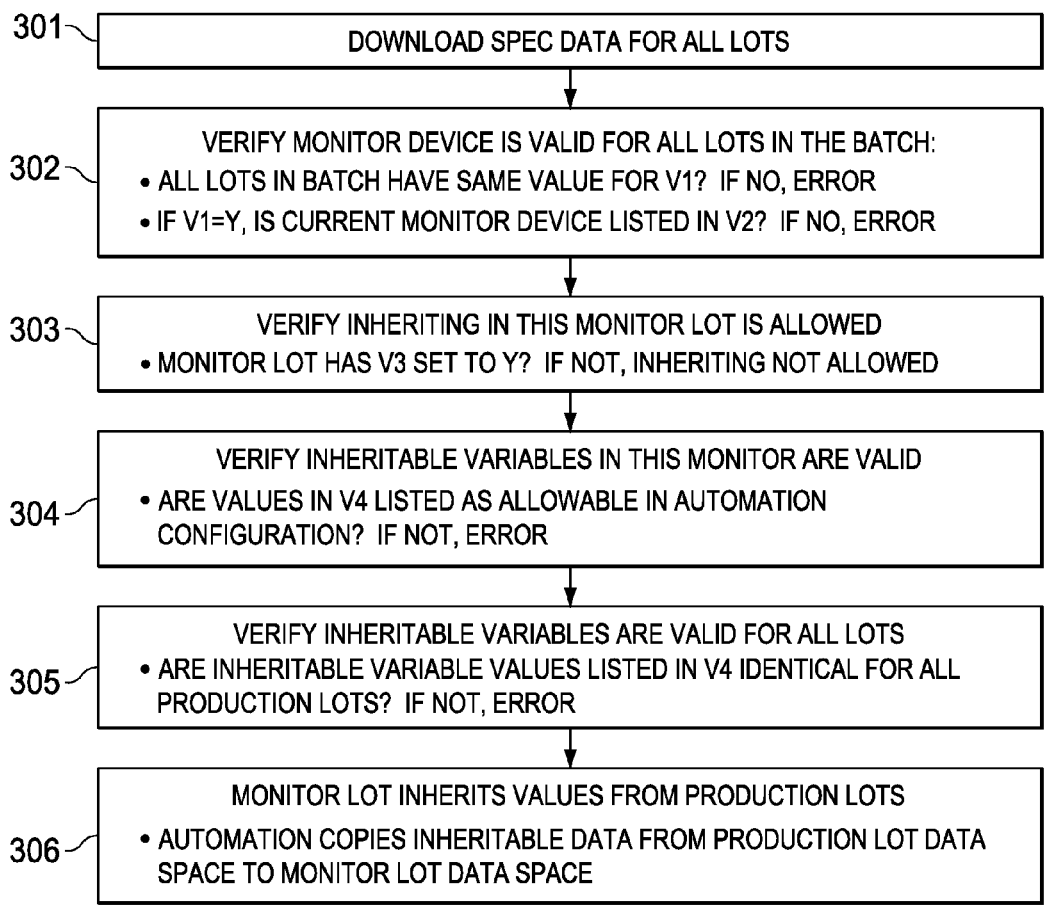
FIG. 3 shows an automation flow diagram for an example batch confirmation algorithm being part of staging a batch step for the method shown in FIG. 1A, according to an example embodiment.

FIG. 3 shows an automation flow diagram for an example batch confirmation algorithm being part of staging a batch step (step 103) of method 100 shown in FIG. 1A, according to an example embodiment. There are 4 variables utilized, including variable 1 (V1) used to verify the monitor device is valid for all product lots in the batch, variable 2 (V2) being a list of valid monitor devices, variable 3 (V3) which enables inheriting for the monitor lot, and variable 4 (V4) which is a list of inheritable variables.

Step 301 comprises downloading the process specification data such as process recipe, target value, automated control model, etc. from all production lots as selected by Real Time Dispatch (default setting) or manually overridden by the operator to confirm that they are matched. Step 302 comprises verifying the monitor device wafer is valid for all lots in the batch. If all lots in batch do not have same value for V1, an error is indicated, and if V1=Y (true), it is checked whether the current monitor device is listed as a V2. If not, than an error is indicated. An explicit error message can be displayed that includes the responsible party (e.g. process, automation, or equipment engineer etc.) and instructions to resolve the error.

Step 303 comprises verifying inheriting in this monitor lot is allowed, here whether the monitor lot has V3 set to Y? If not, inheriting in this monitor lot is not allowed. Step 304 comprises verifying inheritable variables in this monitor are valid, in this example are values in V4 listed as allowable in automation configuration? If not, an explicit error message can be displayed that includes the responsible party and instructions to resolve the error. Step 305 comprises verifying inheritable variables are valid for all production lots in the batch, if not, an explicit error message can be displayed that includes the responsible party and instructions to resolve the error. Step 306 comprises the monitor lot inheriting values from production lots, where automation copies inheritable data from production lot data space into monitor lot data space. The monitor lot thus inherits the process conditions from the production lots. However, the production lots acquire the data (i.e. particle count, thickness, etc.) from the monitor.

Figure 4A:
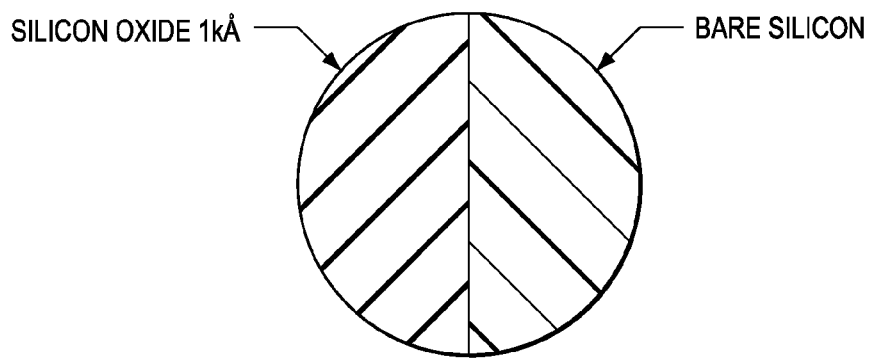
FIG. 4A and FIG. 4B show example monitor wafers have two different substrate surface arrangements that permit monitoring two different process steps previously with each process requiring different monitor wafer types, according to example embodiments.
Figure 4B:
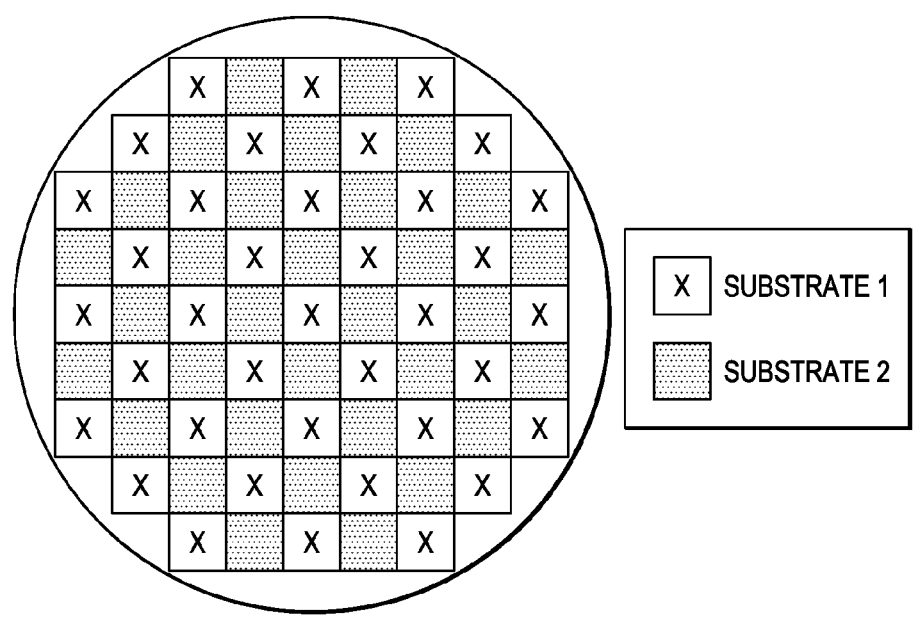

FIG. 4A and FIG. 4B show two different substrate arrangements that permit monitoring different process steps previously each requiring different monitor wafer types, according to example embodiments. FIG. 4A shows the left side of the silicon wafer having a 1,000 A (1 kA) silicon layer on silicon, with the right side have a bare silicon surface. FIG. 4B an alternating die pattern of a first substrate type shown as Substrate 1 (e.g., a 1 kA silicon layer on silicon) and a second substrate type shown as Substrate 2 (e.g., a silicon wafer having a bare silicon surface). A simple masking then etching may be used to form both the substrate arrangements shown. This concept can be extended to 3 or more different substrate arrangements on the same substrate (e.g., wafer).

Inventive distinctions for disclosed monitor pre-process data attachment to product lots for batch processes include consolidation to a single monitor device which can be utilized for different production flows that utilize the same batch process step. Preliminary steps (pre-measuring) are removed from the production lot flow, and the pre-measurement data collection is performed on only the monitor lot (instead of all production lots in the batch). Disclosed embodiments allow production to be staged at the batch process step instead of at the initial measurement step. Disclosed embodiments support automation checks to enforce the correct monitor starting material is used (i.e. enforces correct the monitor device), such as described above relative to FIG. 3.

Disclosed embodiments also provide functionality to inherit parameter values from production, and include flexible parameter inherit functionality that allows different combinations of parameter values to be inherited. The pre-measurement monitor data is transferred to the production lots in the batch for data collection and calculation after batch processing. The practice of using undocumented wafers/cassettes is also replaced.

Advantages of disclosed embodiments include allowing pre-measurements to occur prior to batch creation and processing thus speeding up production cycle time. Applicability is for multiple metrology parameters, qualifications or production, and across multiple processes that utilize process control monitors. Disclosed embodiments also eliminate the need to create and maintain multiple monitor device flows, and improve product quality by reducing time window violations and eliminating incorrect monitor starting material usage. Disclosed embodiments also reduce the need for additional storage/lot cards/cassettes/pods as there will be less monitor types. Disclosed embodiments also can improve pilot wafer recycling by maintaining a documented process flow.

Those skilled in the art to which this disclosure relates will appreciate that many other embodiments and variations of embodiments are possible within the scope of the claimed invention, and further additions, deletions, substitutions and modifications may be made to the described embodiments without departing from the scope of this disclosure.

The invention claimed is:

1. A method of process control for a batch process, comprising:
   pre-measuring a monitor lot including at least a first monitor unit to obtain pre-metrology data regarding at least a first process parameter;
   saving said pre-metrology data together with an identifier for said first monitor unit;
   staging a batch for said batch process comprising at least a first product lot including a plurality of product units together with said first monitor unit;
   batch processing said batch through said batch process;
   after said batch processing, post-measuring said first monitor unit to obtain post-metrology data for said first process parameter; and
   saving at least one of said post-metrology data and a difference between said post-metrology data and said pre-metrology data to a data file with an identifier for said first product lot,
   wherein said product units in said first product lot are not included in said pre-measuring with said monitor lot.

2. The method of claim 1, wherein said batch process comprises a semiconductor process, wherein said first monitor unit comprises monitor wafer(s), said plurality of product units comprises a plurality of product wafers and said pre-metrology data comprises pre-particle data and pre-thickness data.

3. The method of claim 2, wherein said at least a first product lot comprises said first product lot and at least a second product lot each having different production flows.

4. The method of claim 3, further comprising confirming said batch including verifying whether said monitor wafer(s) is valid for both said first product lot and said second product lot.

5. The method of claim 1, wherein said staging comprises automatic staging.

6. The method of claim 2, wherein said monitor wafer(s) include at least two regions having different surface layers.

7. The method of claim 2, further comprising a disassemble step wherein said monitor wafer(s) are placed in queue for rework or reclaim.

8. A computer program product, comprising:
a non-transitory data storage medium that includes program instructions for a processor to execute a method of controlling staging for batch processes, said computer program product comprising:
    code for staging a batch for a batch process comprising at least a first product lot including a plurality of product units together with a monitor lot including at least a first monitor unit, said monitor lot having stored pre-metrology data regarding at least a first process parameter saved together with an identifier for said first monitor unit, wherein said product units in said first product lot are not included in a pre-measuring step with said monitor lot where said pre-metrology data is obtained, and
    code for saving at least one of post-metrology data for said first process parameter and a difference between said post-metrology data and said pre-metrology data to a data file with an identifier for said first product lot, wherein the code is also for directly writing said pre-metrology data and said post-metrology data to said first product lot after (i) batch processing said batch through said batch process and (ii) post-measuring said first monitor unit to obtain said post-metrology data.

9. The computer program product of claim 8, wherein said batch process comprises a semiconductor process, wherein said first monitor unit comprises monitor wafer(s), said plurality of product units comprises a plurality of product wafers and said pre-metrology data comprises pre-particle data and pre-thickness data.

10. The computer program product of claim 9, wherein said at least a first product lot comprises said first product lot and at least a second product lot each having different production flows.

11. The computer program product of claim 10, wherein said computer program product further includes code for confirming said batch including verifying whether said monitor wafer(s) is valid for both said first product lot and said second product lot.

12. A method of process control for a batch process, comprising:
    pre-measuring a monitor lot including at least a first monitor unit to obtain pre-metrology data regarding at least a first process parameter;
    saving said pre-metrology data together with an identifier for said first monitor unit;
    staging a batch for said batch process comprising at least a first product lot including a plurality of product units together with said first monitor unit;
    batch processing said batch through said batch process;
    after said batch processing, post-measuring said first monitor unit to obtain post-metrology data for said first process parameter, and
    directly writing said pre-metrology data and said post-metrology data to said first product lot,
    wherein said product units in said first product lot are not included in said pre-measuring with said monitor lot.

13. The method of claim 12, wherein said batch process comprises a semiconductor process, wherein said first monitor unit comprises monitor wafer(s), said plurality of product units comprises as plurality of product wafers and said pre-metrology data comprises pre-particle data and pre-thickness data.

14. The method of claim 13, wherein said at least a first product lot comprises said first product lot and at least a second product lot each having different production flows.

15. The method of claim 14, further comprising confirming said batch including verifying whether said monitor wafer(s) is valid for both said first product lot and said second product lot.

16. The method of claim 13, wherein said monitor wafer(s) include at least two regions having different surface layers.

17. The method of claim 13, further comprising a disassemble step wherein said monitor wafer(s) are placed in queue for rework or reclaim.

18. The method of claim 12, wherein said staging comprises automatic staging.

* * * * *